(12) United States Patent
DiGiovanni et al.

(10) Patent No.: US 8,755,653 B2
(45) Date of Patent: Jun. 17, 2014

(54) FIBER-BASED PHOTONIC MICRODEVICES WITH SUB-WAVELENGTH SCALE VARIATIONS IN FIBER RADIUS

(75) Inventors: David J. DiGiovanni, Mountain Lakes, NJ (US); Mikhail Sumetsky, Bridgewater, NJ (US)

(73) Assignee: OFS Fitel, LLC, Norcross, GA (US)

( * ) Notice: Subject to any disclaimer, the term of this patent is extended or adjusted under 35 U.S.C. 154(b) by 190 days.

(21) Appl. No.: 13/396,780

(22) Filed: Feb. 15, 2012

(65) Prior Publication Data

US 2012/0213474 A1 Aug. 23, 2012

Related U.S. Application Data

(60) Provisional application No. 61/445,524, filed on Feb. 22, 2011.

(51) Int. Cl.
 *G02B 6/10* (2006.01)
 *G02B 6/26* (2006.01)

(52) U.S. Cl.
 USPC ............................................. 385/39; 385/129

(58) Field of Classification Search
 USPC ...................... 385/39–49, 129, 130, 131, 147
 See application file for complete search history.

(56) References Cited

U.S. PATENT DOCUMENTS

| | | | | |
|---|---|---|---|---|
| 6,282,345 | B1 * | 8/2001 | Schimpe | 385/50 |
| 7,352,933 | B2 * | 4/2008 | Fan et al. | 385/43 |
| 2001/0033587 | A1 * | 10/2001 | Painter et al. | 372/6 |
| 2002/0068018 | A1 * | 6/2002 | Pepper et al. | 422/82.05 |

OTHER PUBLICATIONS

Farca et al., "Cavity-Enhanced Laser Absorption Spectroscopy using Microresonator Whispering-Gallery Modes", Dec. 10, 2007/ vol. 15, No. 25/Optics Express.

* cited by examiner

*Primary Examiner* — Akm Enayet Ullah
(74) *Attorney, Agent, or Firm* — Wendy W. Koba, Esq.

(57) ABSTRACT

Complex, coupled photonic microdevices are formed to include sub-wavelength-sized radial perturbations sufficient to create resonant cavities, where these devices may be formed along the length of a single optical fiber and coupled together to form relatively complex photonic devices. By carefully selecting the placement and separation of these local radius variations, and using microfibers (or other suitable arrangements) to couple optical signals into and out of the device fiber, resonances in the form of whispering gallery modes (WGMs) are created in the device fiber such that a number of coupled microstructures (such as ring resonators) may be formed.

20 Claims, 3 Drawing Sheets

$z_{1,2}$ — COORDINATES OF MICROFIBERS
$z_y$ — COORDINATES OF TURNING POINTS (a)

(b) PRIOR ART

FIBER-BASED PHOTONIC MICRODEVICES WITH SUB-WAVELENGTH SCALE VARIATIONS IN FIBER RADIUS

CROSS-REFERENCE TO RELATED APPLICATIONS

This application claims the benefit of U.S. Provisional Application No. 61/445,524, filed Feb. 22, 2011 and herein incorporated by reference.

TECHNICAL FIELD

The present invention relates to devices such as resonators formed from coupled photonic microdevices and, more particularly, to the formation of microdevices utilizing optical fiber with sub-wavelength (e.g., nanometer-scale) radius variations to create coupled resonant cavities.

BACKGROUND OF THE INVENTION

Miniature resonant photonic devices as known in the art are created from coupled high Q-factor cavities, for example, ring or photonic crystal resonators. The resonance is a result of circulating whispering gallery modes (WGMs) that are created within circular structures as an optical signal travels around the circumference of the structure, undergoing repeated internal reflections at near-grazing incidence. The leakage of light can be very small in these structures, leading to high intrinsic quality factors (Q factors). The Q factor is generally defined as a measure of energy loss relative to the energy stored in a resonator (or any type of oscillating device), characterized by the center frequency of a resonance divided by its bandwidth. The preferred "high Q" resonator is therefore associated with a relatively narrow and sharp-peaked resonance feature.

These miniature resonant photonic devices may be fabricated into more complex structures which can be coupled to each other and perform more complex functions (structures such as, for example, filters, dispersion compensators, delay lines, and the like), in a manner similar to conventional planar photonic resonant microstructures.

Conventional resonator structures are formed by creating features whose size is of the order of the wavelength of the propagating optical signal, or greater. For example, known rings or toroids or spheres are typically tens of microns in dimension. Such structures are commonly created using lithographic techniques (for example, etching a silicon material to create the feature pattern) with the undesirable result of surface roughness. The lithography-associated roughness leads to scattering of a propagating optical signal, reducing the Q factor of the device. In addition, the conventional fabrication process inaccuracies limit the precision with which multiple devices can be coupled together to form more complex structures. While it would be useful to create resonator structures with even smaller dimensions (i.e., sub-wavelength), which offers certain advantages in terms of performance, such smaller dimensions pose additional difficulties in fabrication. Thus, the required accuracy of sub-micron fabrication is difficult to achieve and the necessary techniques for achieving reproducible results of the accuracy required for optical devices have not yet been developed.

SUMMARY OF THE INVENTION

The present invention provides one or more solutions to the above presented problems and is related to the development of complex, coupled photonic microdevices comprising microstructures that are formed to include sub-wavelength sized radial perturbations sufficient to create resonance cavities, where the microstructures may be disposed to couple together and form relatively complex photonic microdevices.

In a preferred embodiment, several of the resonant microstructures are formed along a length of an optical fiber, where the fiber is configured to include sub-wavelength (e.g., nanometer-scale) variations in radius that are used to support WGMs at several locations along the length of the fiber (hereinafter referred to as the "device fiber"). By carefully selecting the placement and separation of these local radius variations, and using microfibers (or other suitable arrangements) to couple optical signals into and out of the device fiber, a number of coupled microstructures (such as, for example, ring resonators) may be formed.

The variations in radius may be used to form "tapered" regions, with a monotonic decrease in radius as a function of length, or "bottle" regions where the radius increases up to a specific location along the length of the microfiber, and then decreases beyond this location. While actual, physical modifications in radius may be used, it is also possible to provide sub-wavelength changes in the "effective radius" of the optical fiber by introducing localized changes in the refractive index (adding or depleting dopants, for example) or altering the local strain state or temperature of the fiber. The change in effective radius may also be varied as a function of time (e.g., applying a strain for a first time period, removing the strain for a second time period), creating a type of optical switching device. Combinations of both types of variations (physical and effective) may also be used.

In some embodiments, a plurality of microfibers (i.e., fibers with a diameter on the order of about one micron or less) may be used to excite WGMs at a plurality of different locations along the length of the device fiber (i.e., associating a plurality of microfibers with a plurality of microstructures formed along the length of the device fiber).

In other embodiments, the "exciting" microfiber may be replaced with a planar waveguide to supply the optical input signal to the device fiber, and similarly couple a portion of a propagating optical signal into the device fiber and excite WGMs to circulate within the specific regions of the device fiber. A free space optical input signal may also be used. Other embodiments depict using a combination of microfibers, planar waveguides, free space optical signals or, in general, any suitable arrangement for introducing an optical signal to the device fiber (hereinafter referred to at times as "optical guiding arrangements" and intended to include the utilization of free space optical signals).

The input optical guiding arrangement (microfiber, planar waveguide, free space source, or the like) needs to be positioned close enough to the device fiber so as to provide for evanescent coupling of the optical signal into the device fiber. In one embodiment, the input optical guiding arrangement may be positioned to physically contact the device fiber (although physical contact is not required in all instances). The relative orientation of the input optical guiding arrangement to the device fiber is also a factor in the degree of coupling achieved between the two elements, with optimum coupling achieved when the propagation direction of the input optical signal is disposed normal to the optical axis of the device fiber.

In one specific embodiment, the present invention defines a photonic device comprising an optical fiber including a plurality of regions exhibiting sub-wavelength variations in effective radius sufficient to form a plurality of microcavities for supporting propagation of whispering gallery modes (WMGs) therein, the regions formed in a spaced-apart configuration along a length of the optical fiber, where the device has at least one optical signal guiding arrangement for supporting the propagation of an input optical signal at a predetermined wavelength, the at least one optical guiding arrangement disposed to the optical fiber so as to create evanescent coupling of the input optical signal to the optical fiber and excite WGMs within at least one microcavity formed within the optical fiber.

The various combinations of these embodiments thus allows for the creation of a large number of different, complex structures, based on creating sub-wavelength (e.g., nanometer-scale) variations in a device fiber.

Indeed, other and further variations and aspects of the present invention will become apparent during the course of the following discussion and by reference to the accompanying drawings.

BRIEF DESCRIPTION OF THE DRAWINGS

Referring now to the drawings, where like numerals represent like parts in several view.

DETAILED DESCRIPTION

In photonics, a "dark state" of a resonant structure is defined as a state in which coupling into a waveguide is forbidden, or is much smaller than a regular (bright) state. Dark states were originally explored in the interactions of light and atoms, and are known to give rise to the effect of electromagnetically-induced transparency. The understanding and utilization of dark states is of fundamental importance to the slowing, stopping and storing of light, high-precision spectroscopy, sensing, atomic clocks, metrology and the like. Recently, there has been interest in the application of dark states to photonic, plasmonic and metamaterial nanostructures.

For the purposes of the present invention, the attributes of dark states are investigated with respect to photonic devices created from coupled high Q-factor microcavities (e.g., ring resonators, photonic crystal resonators). Acceptable performance of these devices requires sub-nanoscale fabrication accuracy and is significantly affected by imperfections in the fabrication methods and materials used to form these devices.

It has been found that well-defined dark states exist in an optical fiber coupled to a transversely-oriented microfiber in the form of well-bounded WGMs, as discussed in detail in co-pending application Ser. No. PCT/US2011/51879 filed Sep. 16, 2011 and herein incorporated by reference. Appearance of dark states is ensured by relatively simple (i.e., linear or quadratic) nanometer-scale radius variation of the fiber. Such a small variation exists naturally in optical fibers, or can easily be introduced in a controlled manner in post-fabrication processes. As will be described in detail below, the ability to utilize the presence of dark states in nanometer-scale photonic devices provides an opportunity for fiber-based devices to be used for sensing, switching and slowing light. Formed of silica, these devices exhibit much smaller losses than comparable lithographically-fabricated resonant devices, while also offering the advantage of being able to be integrated within a single optical fiber (the "device fiber").

Figure 1:
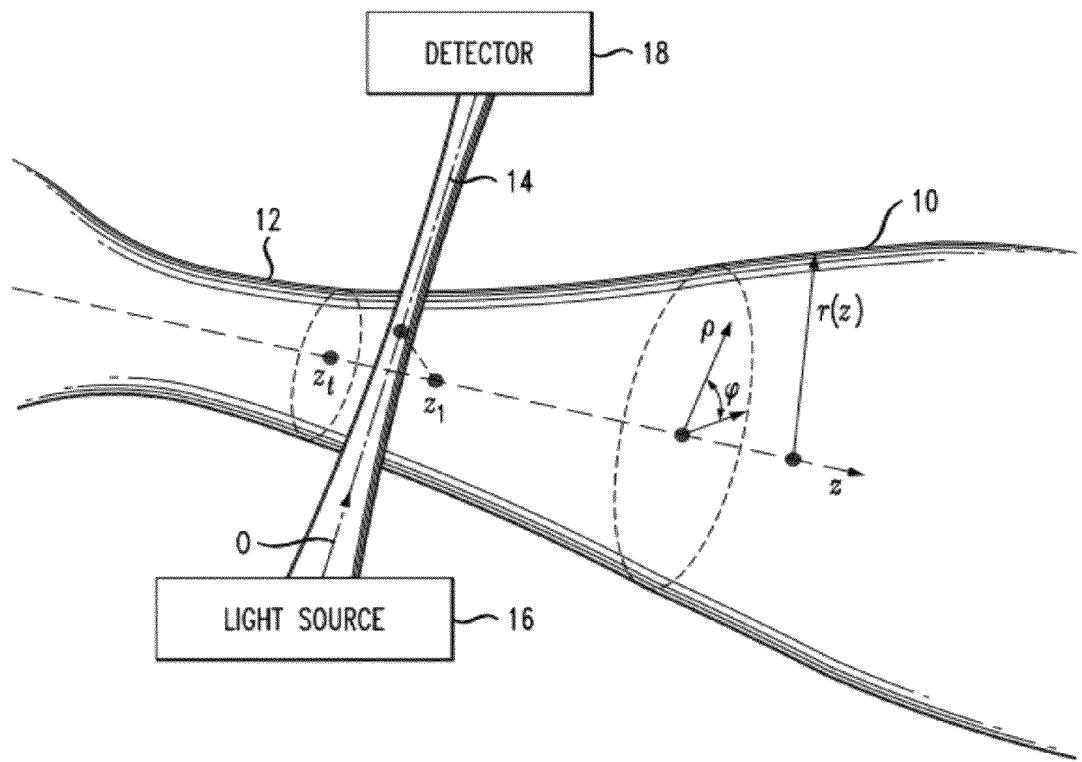
FIG. 1 illustrates an exemplary arrangement of the invention, illustrating sub-wavelength-scale variations in fiber radius used to support whispering gallery modes (WGMs) within a confined area.

FIG. 1 illustrates an exemplary arrangement which is utilized to create WGMs in a tapered section of optical fiber, as more fully described in our co-pending application cited above. As shown, a section of optical fiber 10 (hereinafter referred to as "device fiber 10") is formed to include a tapered region 12, where the tapering is formed on a nanometer scale. That is, the radius of device fiber 10 is formed to decrease on a nanometer scale as a function of length. An exemplary length l of tapered region 12 is generally on the order of the wavelength associated with a propagating optical signal (e.g., for a 1.3 or 1.5 µm input signal, a tapered region having a length l on the order of one micron is suitable).

An optical microfiber 14 supplies an input optical signal to device fiber 10. In general, a "microfiber" is defined as an optical fiber having a diameter on the order of about 0.1 to 10 times the propagating wavelength; for a 1.5 µm signal, this translates to a diameter on the order of 0.15-15 µms one micron. It is to be understood that any suitable type of optical fiber that creates evanescent coupling may be used to provide an input signal to device fiber 10, with the present discussion using the term "microfiber" for convenience only. Referring to FIG. 1, optical microfiber 14 is positioned close enough to device fiber 10 so that evanescent coupling occurs and at least a portion of the optical signal propagating along microfiber 14 transfers to device fiber 10. In one embodiment, optical microfiber 14 may be disposed to physically contact device fiber 10, ensuring the creation of evanescent coupling. Additionally, optical microfiber 14 is preferably oriented normal to the optical axis (z-axis in FIG. 1) of device fiber 10 to provide maximum coupling efficiency. Obviously, other orientations may be used in accordance with the present invention and still result in the generation of WGMs within device fiber 10.

Continuing with reference to FIG. 1, a light source 16 is shown as used to introduce an optical signal O into microfiber 14. As optical signal O propagates along microfiber 14, a portion of the signal O evanescently couples into tapered region 12 of device fiber 10 and creates WGMs in device fiber 10 within the vicinity of the overlap between device fiber 10 and microfiber 14, as shown in FIG. 1. Optical signal O continues to propagate along microfiber 14 and is ultimately coupled into a detector 18, which measures the characteristics of the received signal to monitor the resonant behavior within device fiber 10, as will be discussed in detail below. It is also to be noted that while the various embodiments described below illustrate the use of a microfiber to interact with the device fiber and excite the WGMs, it is also possible to use other types of optical, planar waveguide structures, or free space optical signals (i.e., optical guiding arrangements) as the optical "input/output" to excite the WGMs in device fiber 10.

The characteristic length of the WGMs along device fiber 10 as discussed below is on the order of $\Delta z \sim 100$ µm. As a result, a nanometer-scale fiber radius variation along this length corresponds to an extremely large radius of curvature R on the order of 1 meter. For the arrangement of FIG. 1, it can be shown that a dark state will be fully confined between a turning point, $z_t$, and $z_1$, the point where microfiber 14 couples to device fiber 10.

Figure 2:
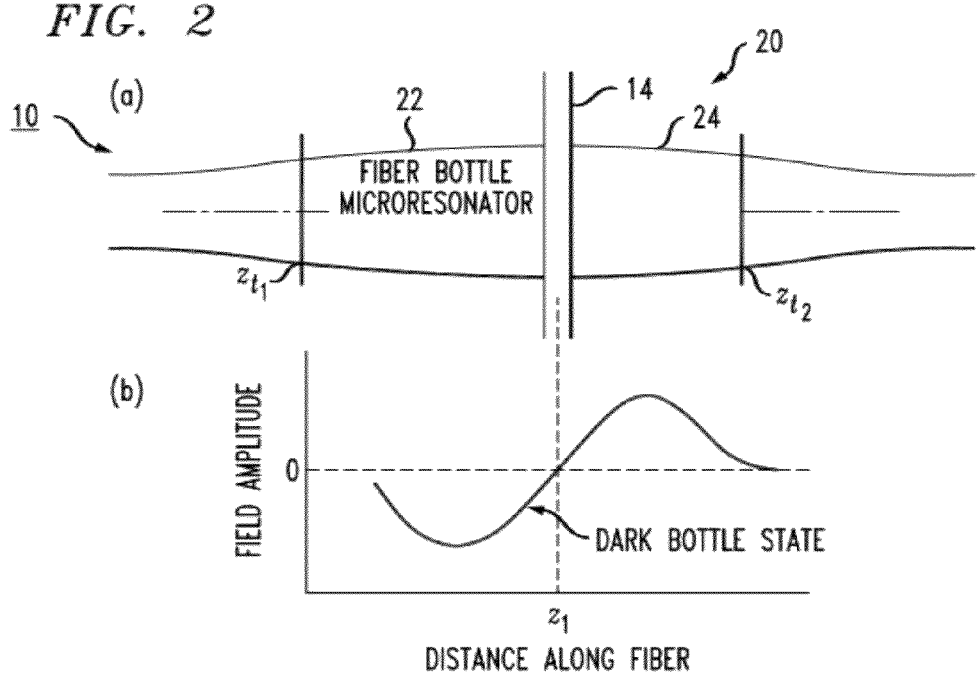
FIG. 2(a) illustrates an embodiment of the invention utilizing a "bottle" region exhibiting sub-wavelength-scale increasing, followed by decreasing, of the optical fiber radius.
FIG. 2(b) is a field amplitude plot of the embodiment of FIG. 2(a)

FIG. 2(*a*) illustrates an embodiment of the invention where device fiber 10 includes a "bottle" region 20 instead of a tapered region 12 as shown in the device of FIG. 1. Referring to FIG. 2(*a*), region 20 of device fiber 10 includes a first portion 22 having a monotonically increasing fiber radius, followed by a second portion 24 having a monotonically decreasing fiber radius. Microfiber 14 is used in a similar fashion as described above to excite WGMs within bottle region 20. For this configuration, the WGMs are confined along device fiber 10 between turning points $z_{t1}$ and $z_{t2}$, where a dark state is created if microfiber 14 is positioned at a node of the confined WGM, as shown in the field amplitude plot of FIG. 2(*b*).

For the purposes of the present invention, device fiber 10 (in particular, tapered regions 12, 22 or 24) is assumed to have a small, sub-wavelength-scale radius variation defined as follows:

$$r(z) - r_0 = \Delta r(z),$$

where $r_0$ is the nominal radius, and z is defined as the fiber axis. The WGMs excited by microfiber 14 experience resonances in the vicinity of the wavelengths defined by:

$$\lambda = \lambda_q = 2\pi n_{eff} r_0 / q,$$

where q is a large positive integer and $n_{eff}$ is the effective refractive index of the WGM. For the purposes of this analysis, microfiber 14 is considered to be a point source of coherent light launched at the surface of device fiber 10 at the location $z=z_1$, with a wavelength $\lambda_c$ near the resonance, that is $|\lambda_c - \lambda_q| \ll \lambda_q/q$. In cylindrical coordinates, the resonant WGM is defined as $U(z,\rho,\phi,\lambda) = \exp(iq\phi) F(\rho) G(z,z_1,\lambda)$, where $F(\rho)$ is the standard radial mode component of device fiber 10 and $G(z,z_1,\lambda)$ is proportional to the Green function of the Schrödinger equation:

$$G_{zz} + \kappa^2(z) G = \Gamma \delta(z - z_1), \text{ where}$$

$$\kappa^2(z) = E + \frac{i}{2}(\gamma + \Gamma) - V(z),$$

$$E = \frac{(\lambda_q - \lambda) q^3}{(\pi n_{eff} r_0^3)}, \text{ and}$$

$$V(z) = \frac{2q^2 \Delta r(z)}{r_0^3}.$$

Here, $\kappa(z)$ is the small z-component of the propagation constant and $\gamma$ and $\Gamma$ are the attenuation and coupling constants, respectively. The resonance transmission amplitude $f(\lambda)$ through microfiber 14 is defined as follows:

$$f(\lambda) = 1 - G(z_1, z_1, \lambda).$$

For the embodiment of FIG. 1 (a tapered region 12 along device fiber 10), $\Delta r_z$ monotonically increases with z and, in the absence of microfiber 14, does not support any localized state. Therefore, the solution of the Schrödinger equation for this arrangement is an outgoing wave for $z \geq z_1$, and which exponentially vanishes for z less than turning point $z_t$ (i.e., the point where $\kappa(z)=0$). At quantized wavelengths of dark states, i.e., $\lambda_q^{(n)}$, n=0, 1, 2, . . . , the condition of destructive interference requires $G(z,z_1,\lambda_q^{(n)})=0$ at $z \geq z_1$. As noted from the above relations, at these wavelengths, microfiber 14 and the dark states are optically decoupled, since G(.)=0; that is, the resonant field amplitude at the position of microfiber 14 is equal to zero. At this same time, at these same wavelengths, the distribution of light along the axis z of device fiber 10 is fully localized.

The above equations also determine the resonant field and transmission amplitude for arbitrary $\Delta r(z)$, generalizing the case of a uniform and conical microresonator when $\Delta r(z)$ is a constant and a linear function, respectively. For the sake of comparison to these two situations, a quadratic variation of $\Delta r(z)$ is considered, that is, $r(z) = r_0 + z^2/(2R)$. The solution of the Schrödinger equation can be expressed through the dimensionless deviation of wavelength, denoted $\overline{\Delta \lambda}$, and distance, denoted $\overline{z}$:

$$\overline{\Delta \lambda} = \frac{\lambda - \lambda_q}{\delta \lambda_0},$$

$$\overline{z} = \frac{z}{\delta z_0}, \text{ and}$$

$$\overline{z_1} = \frac{z_1}{\delta z_0}, \text{ where}$$

$$\delta \lambda_0 = (2\pi n_{eff})^{-1} r_0^{-1/2} R^{-1/2} \lambda_q^2, \text{ and}$$

$$\delta z_0 = (2\pi n_{eff})^{-1/2} \lambda_q^{1/2} r_0^{1/4} R^{1/4}.$$

Figure 3:
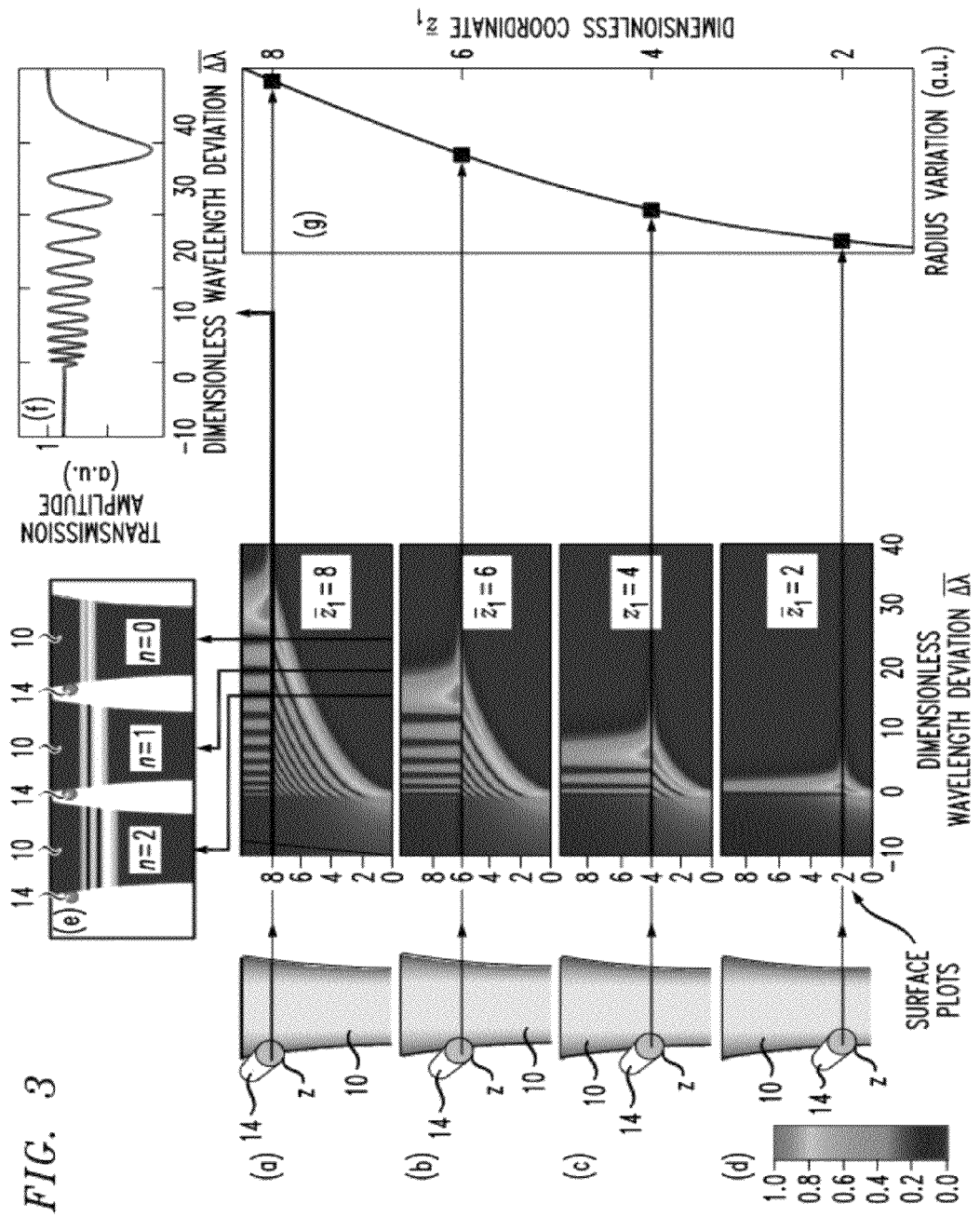
FIGS. 3(a)-(d) are surface plots of the resonant field amplitude for different positions of an input microfiber along a tapered device fiber.
FIG. 3(e) depicts the spatial distribution of dark states for three different states (n=0, 1, 2)
FIG. 3(f) is a graph of the transmission plot for one exemplary position of an input microfiber.
FIG. 3(g) is a plot of radius variation of the device optical fiber as a function of length.

FIGS. 3(*a*)-(*d*) show the surface plots of the amplitude of the resonance field $\overline{G}(\overline{z},\overline{z_1},\overline{\Delta \lambda}) = G(z,z_1,\lambda)$ in the plane $(\overline{\Delta \lambda}, \overline{z})$ for the following fixed dimensionless positions of microfiber 14: $\overline{z_1}$=8, 6, 4 and 2, respectively (the value of "2" associated with FIG. 3(*d*), and so on, with the value of "8" associated with the plot of FIG. 3(*a*)). In each of FIG. 3(*a*)-3(*d*), the left-hand portion of the drawing shows the relative position of microfiber 14 and device fiber 10 (the "z" value defining the position) and the right-hand portion of the drawing illustrating the associated surface plot of the amplitude of the resonance field. An interesting feature of these plots is that all of the spectra experience cutoff at the same wavelength, namely, $\lambda = \lambda_q$ (i.e., $\overline{\Delta \lambda}=0$).

The vertical lines in FIG. 3(*a*) indicates the first three dark states, $G(z,z_1,\lambda^{(n)})=0$, 1, 2, with spatial amplitude distributions as depicted in FIG. 3(*e*). It is interesting to note that these dark states are localized away from their source at the contact point between device fiber 10 and microfiber 14. The transmission amplitude of microfiber 14 is plotted in FIG. 3(*f*), for the case of $\overline{z_1}$=8. FIG. 3(*g*) shows the variation of radius of device fiber 10 along region 12 (as calculated from the resonance characteristics) which, as follows from the developed theory, is proportional to the shift of the principal peak in the surface plots of FIGS. 3(*a*)-(*d*). This result is discussed in detail below with respect to the experimental measurement of radius variation along device fiber 10. Summarizing, it can be concluded from the above equations that for a conventional optical fiber with $r_0 \sim 50$ µm, $R \sim 100$ m, and $\lambda \sim 1.5$ µm, the characteristic size and spectral width of the resonant field are $\delta z_0 \sim 100$ µm and $\delta \lambda_0 \sim 3$ pm, respectively.

Referring now to the "bottle" configuration as shown in FIG. 2, it can be shown that the radius variation $\Delta r(z)$ supports fully localized states (also referred to as "bottle states"). The simplest quadratic variation of the radius of device fiber 10 along region 20 is defined as:

$$r(z) = r_0 - z^2/(2R),$$

and the free spectral range (FSR) of the resonant spectrum is defined as:

$$\Delta\lambda_{FSR}=(4\pi n_{eff})^{-1}\lambda_q^2(r_0 R)^{-1/2}.$$

For a conventional optical fiber with the same parameters as defined above, the configuration of FIG. 2 yields a value of $\Delta\lambda_{FSR}$ on the order of 2 pm. As mentioned above, the bottle state becomes dark if the position of microfiber 14 (i.e., $z_1$) coincides with its node, as shown in FIG. 2(b).

Figure 4:
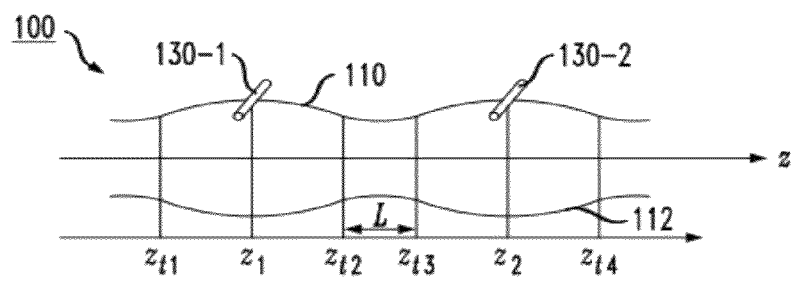
FIG. 4 illustrates an exemplary arrangement of coupled microstructures in the form of microresonators formed in accordance with the present invention.

FIG. 4 illustrates an exemplary arrangement of coupled microstructures in the form of microresonators formed in accordance with the present invention. In this particular embodiment, a device fiber 100 is formed to include a pair of bottle-shaped microresonators 110 and 112, where each microresonator is formed to exhibit sub-wavelength-scale radius variations and is capable of supporting WGMs in the manner described above. In the particular arrangement as shown in FIG. 4, a first microfiber 130-1 is used to excite WGMs within first microresonator 110 and is positioned along microresonator 110 at location $z_1$ along device fiber 100 (preferably oriented to be essentially orthogonal (normal) to the optical axis z of device fiber 100). In a similar fashion, a second microfiber 130-2 is positioned along second microresonator 112 at location $z_2$ and used, in this case, to receive out-coupled WGMs from second microresonator 112. In general, microfibers 130-1 and 130-2 can be used to couple light into or out of the WGMs of the associated microresonators. Given the bottle configuration of each of these elements, a pair of turning points is shown as confining the WGMs, with turning points $z_{t1}$ and $z_{t2}$ associated with first microresonator 110, and turning points $z_{t3}$ and $z_{t4}$ associated with second microresonator 112. A separation of length L between turning point $z_{t2}$ of first resonator 110 and turning point $z_{t3}$ of second resonator 112 is also shown in FIG. 4, that is, this length L represents the length between the edges of resonators 110 and 112, respectively.

The WGMs in each microresonator exhibits a spatial length of field variation $\delta z_0$ as defined above, that is:

$$\delta z_0=(2\pi n_{eff})^{-1/2}\lambda_q^{1/2}r_0^{1/4}R^{1/4}.$$

It can be shown that nanometer-scale variations in radius along device fiber 100, in accordance with the present invention, leads to a value for $\delta z_0$ on the order of several tens of microns. Coupling between microresonators 110 and 112 is proportional to the quantity exp(–S), where S=L/$\delta z_0$ (and L is the distance between the "edges" of the microresonators as defined above).

For example, for a value of $\delta z_0$ of approximately 30 μm, a distance L of approximately 100 μm ensures quite significant coupling between the modes. More accurately, for two identical resonators, the splitting between the resonant wavelengths is determined as:

$$\delta\lambda = \frac{\Delta\lambda_{FSR}}{\pi}\exp\left(-\int_{z_{t2}}^{z_{t3}}|\kappa(z)|dz\right).$$

Figure 5:
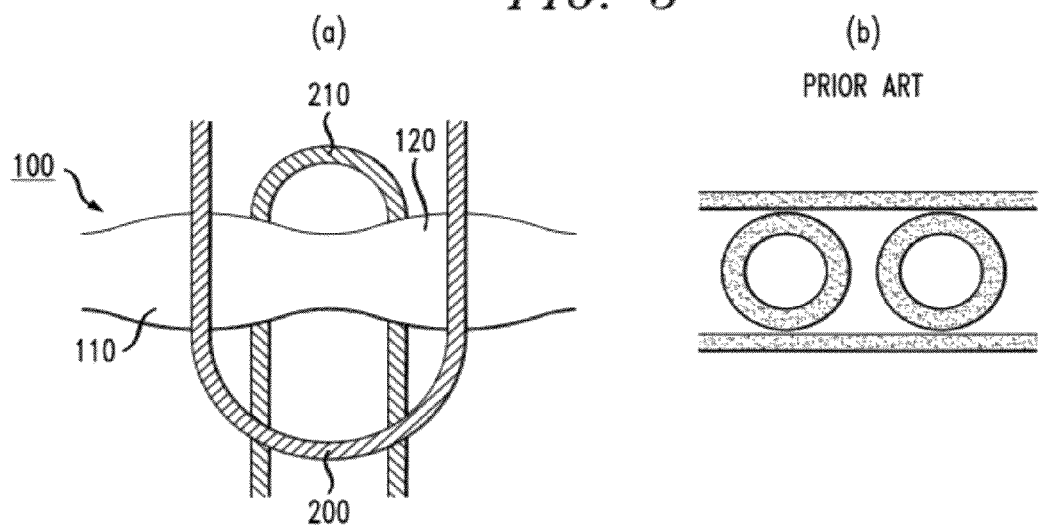
FIGS. 5(a) and (b) depict an exemplary ring microstructures, with FIG. 5(a) illustrating a ring microstructure formed from a device fiber including coupled microcavities of the present invention and FIG. 5(b) illustrating a prior art planar ring microstructure.

As mentioned above, an aspect of the present invention is the ability to create relatively complex devices consisting of a plurality of input/output optical signal paths (microfibers, planar waveguide sources, free space signals, or any combination thereof, collectively referred to as "optical guiding arrangements"), used in conjunction with a single device fiber formed to include a number of resonant structures by introducing sub-wavelength-scale radius variations along the length of the fiber. FIG. 5(a) illustrates one such complex structure, in this case utilizing the microresonators 110 and 112 as shown in FIG. 4, in conjunction with a pair of microfibers 200, 210. The positioning of microfibers 200 and 210 as shown in FIG. 5(a) creates an arrangement similar to a prior art planar ring microstructure, as shown in FIG. 5(b), but created at sub-wavelength dimensions and integrated within a single optical fiber.

Performance of these, and similar, devices requires sub-nanoscale design accuracy and is significantly affected by the imperfections of fabrication methods. It is desirable to have similar microdevices formed of silica, which offer much smaller propagation loss and potentially should exhibit much better performance in terms of sensitivity, Q-factor, delay time, etc., as compared to similar lithographically fabricated photonic circuits. While high purity silica is a suitable material choice for microdevices operating at optical wavelengths in the near infra-red (such as the common telecommunications wavelengths around 1.3 μm and 1.5 μm), other material choices may be more beneficial for other wavelengths. For example, fluorides or chalcogenide fibers may be used at wavelengths beyond 2 μm.

The embodiments of device fibers 10 and 100 as shown in the drawings depict the use of a physical change in fiber radius to create the coupled microresonator structures. This type of physical change can be formed by heating a conventional optical fiber, while either locally stretching or compressing the fiber. Other techniques, such as local etching, may be used, to introduce the desired sub-wavelength variations in the fiber radius as a function of length.

In alternative embodiments of the present invention, since the properties of the WGMs are controlled by both the physical radius of the fiber and the local refractive index value $n_{eff}$, it is possible to create coupled resonator microstructures in accordance with the present invention by altering $n_{eff}$ while maintaining a constant fiber radius (alternatively, it is possible to vary both parameters). Altering the value of $n_{eff}$ can be achieved by altering the strain state of the glass (for example, drawing the fiber under strain and then applying local heating to anneal the strain and thus increase the local refractive index), by altering the composition or by altering the refractive index through well-known methods such as the photorefractive effect in which the index is changed upon exposure to actinic radiation. In the latter case, at least the outer region of the fiber may be doped with suitable materials, such as Ge or Sn to influence the photorefractive properties of the glass. For example, dopants can be added to (or leached out of) the structure during fabrication of the optical fiber. These changes can be made in a "set-it-and-forget-it" operation, or the behavior of the structure can be continuously monitored while altering either one (or both) of the fiber radius and composition.

Alternatively, the changes in fiber radius can be introduced dynamically (i.e., changing as a function of time), such as by altering the ambient temperature of the local region of the device fiber. This type of dynamic control allows for optical switches to be created.

Indeed, any mechanism that induces a permanent or reversible change in $n_{eff}$ may be used to create the microresonator structures in accordance with the present invention.

In general, the "physical" changes in radius and the changes in local refractive index are referred to as introducing changes in the "effective radius" of the device fiber for the purposes of the present invention. It is to be understood that sub-wavelength-scale changes in the effective radius may also be introduced by modifying both the physical radius and the local refractive index of an optical fiber. Additionally, the radial variation of the device fiber may be monotonic, may have a local minimum and a local maximum, or may have several maxima and minima.

Specific embodiments of the present invention may utilize an optical fiber having a radius variation of 0.1-100 nm over lengths of 0.01-100 mm, and used as an optical microresonator for WGMs excited by a transversely-oriented microfiber having a radius of about 1 µm. As mentioned above, the microfiber can be replaced by a planar waveguide structure or free space signal, where specific embodiments may use a combination of these optical guiding arrangements to introduce a plurality of separate optical signals to a plurality of separate microresonator structures formed along a single device fiber (and/or out-couple optical signals from the device fiber).

While specific examples of the invention are described in detail above to facilitate explanation of various aspects of the invention, it should be understood that the intention is not to limit the invention to the specifics of the examples. Rather, the intention is to cover all modifications, embodiments and alternatives falling within the spirit and scope of the invention as defined by the appended claims.

What is claimed is:

1. A photonic device comprising:
    an optical fiber including a plurality of regions exhibiting sub-wavelength scale variations in effective radius, the sub-wavelength scale variations selected to form a plurality of microcavities for supporting propagation of whispering gallery modes (WGMs) therein, the plurality of regions formed in a spaced-apart configuration along a length of the optical fiber; and
    at least one optical guiding arrangement for supporting the propagation of an input optical signal at a predetermined wavelength, the at least one optical guiding arrangement disposed with respect to the optical fiber so as to create evanescent coupling of the input optical signal to the optical fiber and excite WGMs within at least one microcavity of the plurality of microcavities.

2. The photonic device of claim 1 wherein the at least one optical guiding arrangement comprises a plurality of optical guiding arrangements, each optical guiding arrangement of the plurality of guiding arrangements associated with a different microcavity of the plurality microcavities formed in the optical fiber.

3. The photonic device of claim 2 wherein the plurality of optical guiding arrangements is associated with the plurality of microcavities in a one-to-one relationship.

4. The photonic device of claim 1 wherein the at least one optical guiding arrangement comprises an optical fiber that creates evanescent coupling.

5. The photonic device of claim 4 wherein the optical fiber comprises an optical microfiber having a diameter of about 0.1 to 10 times the predetermined wavelength of the input optical signal.

6. The photonic device of claim 1 wherein the at least one optical guiding arrangement comprises a planar optical waveguiding structure.

7. The photonic device of claim 1 wherein the at least one optical guiding arrangement comprises a free space optical signal.

8. The photonic device of claim 1 wherein the at least one optical guiding arrangement is disposed in physical contact with a microcavity of the optical fiber to create evanescent coupling.

9. The photonic device of claim 1 wherein the at least one optical guiding arrangement is oriented to be essentially normal to the optical axis of the optical fiber.

10. The photonic device of claim 1 wherein the sub-wavelength variations in effective radius comprise sub-wavelength variations in the physical radius of the optical fiber.

11. The photonic device of claim 10 wherein at least one region within the optical fiber includes a tapered region where the radius changes monotonically in value.

12. The photonic device of claim 10 wherein at least one region within the optical fiber includes a bottle region where the radius has at least one local maximum value.

13. The photonic device of claim 1 wherein the sub-wavelength scale variations in effective radius comprise variations in the composition of the optical fiber so as to modify a local effective refractive index value.

14. The photonic device of claim 1 wherein the sub-wavelength scale variations in effect radius comprise variations in a local strain value along the optical fiber so as to modify a local effective refractive index value.

15. The photonic device of claim 1 wherein the sub-wavelength scale variations in effective radius comprise variations in the local effective refractive index created by exposure to actinic radiation.

16. The photonic device of claim 1 wherein a dynamic photonic device is formed and the sub-wavelength scale variations in effective radius are varied as a function of time.

17. The photonic device of claim 16 wherein the dynamic photonic device is created by changing a strain applied to a microcavity of the optical fiber as a function of time.

18. The photonic device of claim 16 wherein the dynamic photonic device is created by changing an ambient temperature of a microcavity of the optical fiber as a function of time.

19. The photonic device of claim 1 wherein the input optical signal comprises a wavelength on the order of 1.5 µm and the sub-wavelength scale variations in effective radius within the plurality of regions along the optical fiber are on the order of a nanometer scale.

20. The photonic device of claim 1 wherein a pair of adjacent microcavities of the plurality of microcavities are separated by a predetermined distance L along the optical fiber and coupling between WGMs in these adjacent microcavities is proportional to $\exp(-S)$, where $S = L/\delta z_0$ and $\delta z_0$ is a local spatial length of field variation defined as follows:

$$\delta Z_0 = (2\pi n_{\mathit{eff}})^{-1/2} \lambda_q^{1/2} r_0^{1/4} R^{1/4},$$

$n_{\mathit{eff}}$ defined as the local effective refractive index, $\lambda_q$ is a resonance wavelength, $r_0$ is a nominal radius of the optical fiber and R is radius of curvature of the optical fiber.

* * * * *